United States Patent
Akabane et al.

(10) Patent No.: US 6,991,163 B2
(45) Date of Patent: Jan. 31, 2006

(54) CARD READER

(75) Inventors: Fumihiko Akabane, Nagano (JP); Kazutoshi Ishikawa, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 11/002,772

(22) Filed: Dec. 1, 2004

(65) Prior Publication Data

US 2005/0116036 A1 Jun. 2, 2005

(30) Foreign Application Priority Data

Dec. 2, 2003 (JP) ............................. 2003-403072

(51) Int. Cl.
*G06K 7/08* (2006.01)
(52) U.S. Cl. ...................... 235/449; 235/435; 235/479; 235/483
(58) Field of Classification Search ................ 235/486, 235/487, 380, 435, 379, 375, 485, 449
See application file for complete search history.

(56) References Cited

U.S. PATENT DOCUMENTS

| | | | | |
|---|---|---|---|---|
| 4,613,747 A | * | 9/1986 | McCarthy | ................... 235/480 |
| 4,871,905 A | * | 10/1989 | Mita et al. | ................... 235/475 |
| 5,331,144 A | * | 7/1994 | Shima et al. | ................ 235/486 |
| 5,483,048 A | * | 1/1996 | Kobayashi | ................... 235/380 |
| 5,557,089 A | * | 9/1996 | Hall et al. | .................... 235/440 |
| 5,594,233 A | * | 1/1997 | Kenneth et al. | ............. 235/492 |
| 6,164,538 A | * | 12/2000 | Furuya et al. | .............. 235/449 |
| 6,216,954 B1 | * | 4/2001 | Kuwamoto et al. | ......... 235/486 |
| 6,446,872 B1 | * | 9/2002 | Imai et al. | ................... 235/475 |
| 6,574,058 B1 | * | 6/2003 | Aruga et al. | .................... 360/2 |
| 6,588,659 B2 | * | 7/2003 | May | ........................... 235/380 |

FOREIGN PATENT DOCUMENTS

| | | | | |
|---|---|---|---|---|
| JP | 403046950 A | * | 2/1991 | |
| JP | 405114056 A | * | 5/1993 | |
| JP | 08-096093 | | 12/1996 | |

* cited by examiner

*Primary Examiner*—Karl D. Frech
*Assistant Examiner*—Daniel Walsh
(74) *Attorney, Agent, or Firm*—Reed Smith LLP

(57) ABSTRACT

A card reader that transports a card having a magnetic strip with a drive means to read and write information on the card that includes prehead for detecting the insertion of the card by searching the presence of the magnetic information recorded on the magnetic strip, and a card detecting switch for detecting the card. When the card detecting switch determines that a card is present, the prehead searches the magnetic information. When the card detecting switch does not detect a card, the card is distinguished as a specially-shaped card.

25 Claims, 5 Drawing Sheets

CARD READER

CROSS-REFERENCE TO RELATED APPLICATIONS

This application claims priority to Japanese Application No. 2003-403072 filed Dec. 2, 2003, which is incorporated herein by reference.

FIELD OF THE INVENTION

The present invention relates to a card reader which transports a card having a magnetic strip with a drive means that reads and writes information on the card. More specifically, the present invention relates to a card reader that can differentiate the shape of the card.

BACKGROUND OF THE INVENTION

A card reader/writer used for ATM machines (hereinafter denoted as a card reader), as illustrated in FIG. 3, is equipped with a card detecting switch 6, which is arranged near a card insertion slot to detect the insertion of a card 3, and a card position detector (not illustrated), which is arranged inside the card reader to detect the position of the card. The card detecting switch 6 is turned on as pressed by the inserted card 3 in the lateral direction; it is turned off as the card 3 is detached from the switch. The card position detector is a photo sensor composed of a photo-emitting device and a photo-receiving device, and emits a light beam to pass across a card running path 9 so that the presence of the card 3 can be recognized depending on the detection of the light. In addition to the on/off mechanism of the card detecting switch 6 and the card position detector, the number of steps of a stepping motor, which is output when the card 3 is transported, is used to calculate the length of the card 3. Based on the calculation value, it is determined whether the length of the card is proper.

Note that code 5 in FIG. 3 is given to a prehead which recognizes the insertion of the card 3 by searching magnetic information recorded on a magnetic strip 2 of the card 3. A conventional card reader only detects the insertion of a card using the prehead 5.

In a method in which the card detecting switch 6 is used to recognize the presence of the card 3 with the lateral sides and to detect the length of the card 3, the card position detector can obtain the information on the card in the longitudinal direction and detect the presence of the card 3 in the lateral direction. Thus, this method is effective in determining if the card has a proper length in both longitudinal and lateral directions.

In recent years, cards have made in different shapes for the design appeal. In other words, cards are not always in a standard rectangular shape (see FIG. 5). Accordingly, a card reader needs to determine if the card inserted is in a standard shape or in a special non-standard shape; when the card is in a special non-standard shape, the card reader needs to warn that the writing on the card may be degraded or cannot be guaranteed. (See Laid-open Patent Application H8-96093).

However, in the above-mentioned card reader, the card detecting switch is used to detect the presence of the card only when it is pressed by the card toward the lateral side. Therefore, as illustrated in FIG. 5, a card having a short side that is pressed toward the card detecting switch, i.e., a card in a non-standard shape cannot be detected, degrading the accuracy of judgment on the appropriateness of the card length.

Even when a card is identified as non-standard shape, the card reader still cannot determine if the card was originally in a special, non-standard shape that the card reader can process or if the card may have been broken and resulted in an abnormal shape that the card reader cannot process. In other words, although a conventional card reader can determine the shape of the card to some extent, it cannot differentiate the variety in shapes, such as between a standard shape and a special non-standard shape. For example, the card shown in FIG. 5 shows an example where the magnetic information recorded on the magnetic strip can be read although the writing performance will be degraded. Thus, it is possible for a card reader to selectively process the reading of the magnetic information in this case.

Therefore, it is desirable to provide a card reader that can not only identify a non-standard card shape, but also can differentiate a special non-standard shape from an abnormal shape.

SUMMARY OF THE INVENTION

According to the invention, a card reader which transports a card having a magnetic strip with a drive means to read and write information on the card, comprises a prehead for detecting the insertion of a card by searching the presence of the magnetic information recorded on the magnetic strip, and a card detecting switch for detecting the card, wherein it is determined that the card is present while the prehead searches the magnetic data; and when the card detecting switch does not detect the card, the card is distinguished as a specially-shaped card.

By using a signal from a prehead unlike a conventional device, where the prehead searches magnetic information on the card in transportation, it can easily and accurately be determined whether the card is in a non-standard shape and if it is in a non-standard shape, whether a card in special shape can easily and accurately be distinguished from one in an abnormal shape.

Also, a conventional prehead can be used as is because there is no need to add new components to it. In other words, the present invention can be implemented by simply updating the software for card readers.

As described above, according to the card reader of this invention, a signal from a prehead, which is not used in a conventional device, is used to easily and accurately determine whether a card is in a non-standard shape, and also, when it is in a non-standard shape, to distinguish a card in a special shape from one in an abnormal shape. Therefore, when a card is in a special shape, it can be accurately warned that the writing performance will be degraded.

Also, since a conventional prehead can be used in this invention, there is no need to add new components. Thus, this invention does not require that an extravagant amount of money be spent on card readers already on the market for exchanging products or adding components, but simply requires upgrading the software to keep the cost low.

DETAILED DESCRIPTION OF THE INVENTION

Configurations of the present invention are described herein in detail with reference to the drawings.

Figure 1:
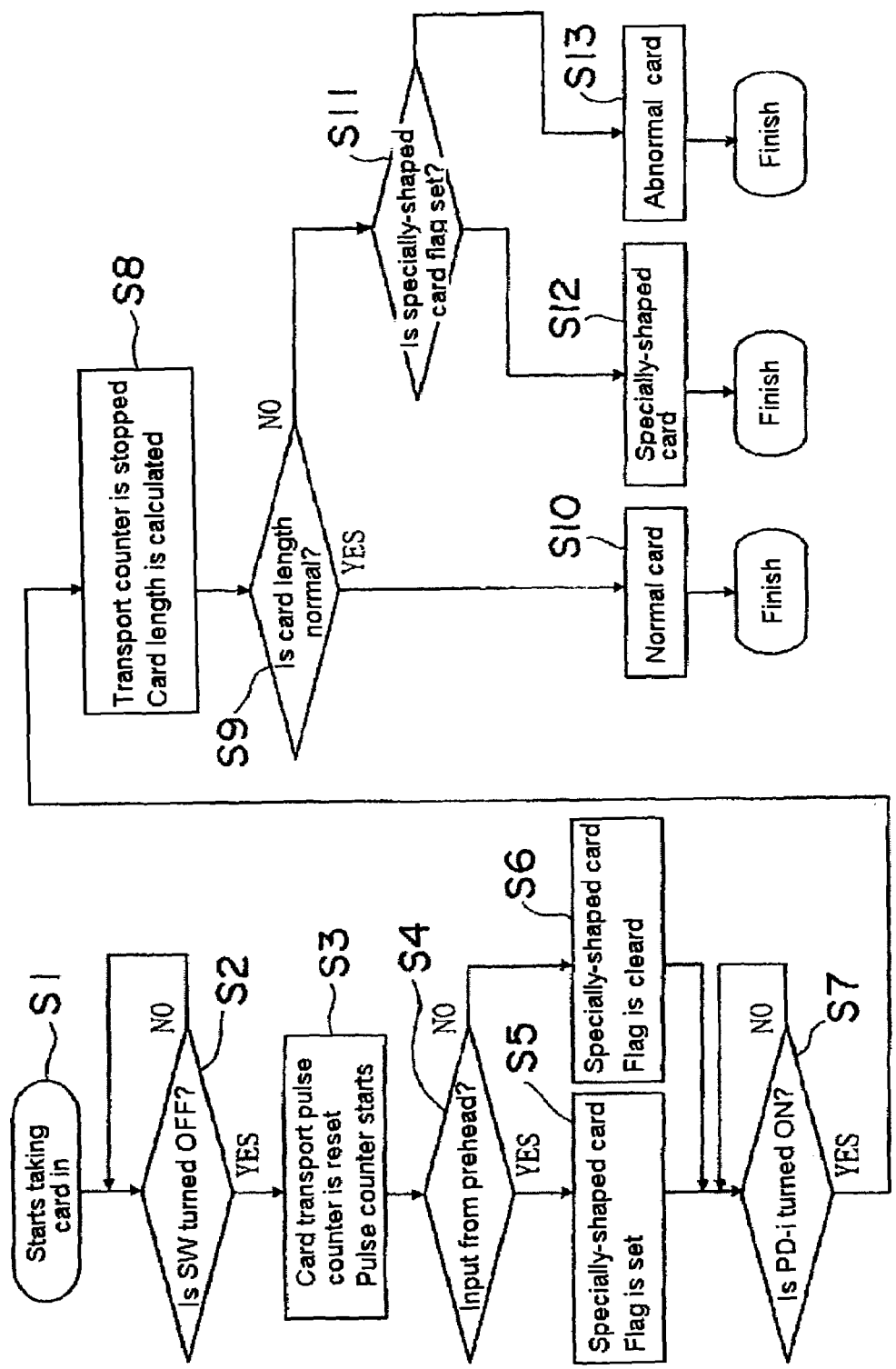
FIG. 1 is a flowchart for differentiating a card shape with a card reader of the present invention.
Figure 2:
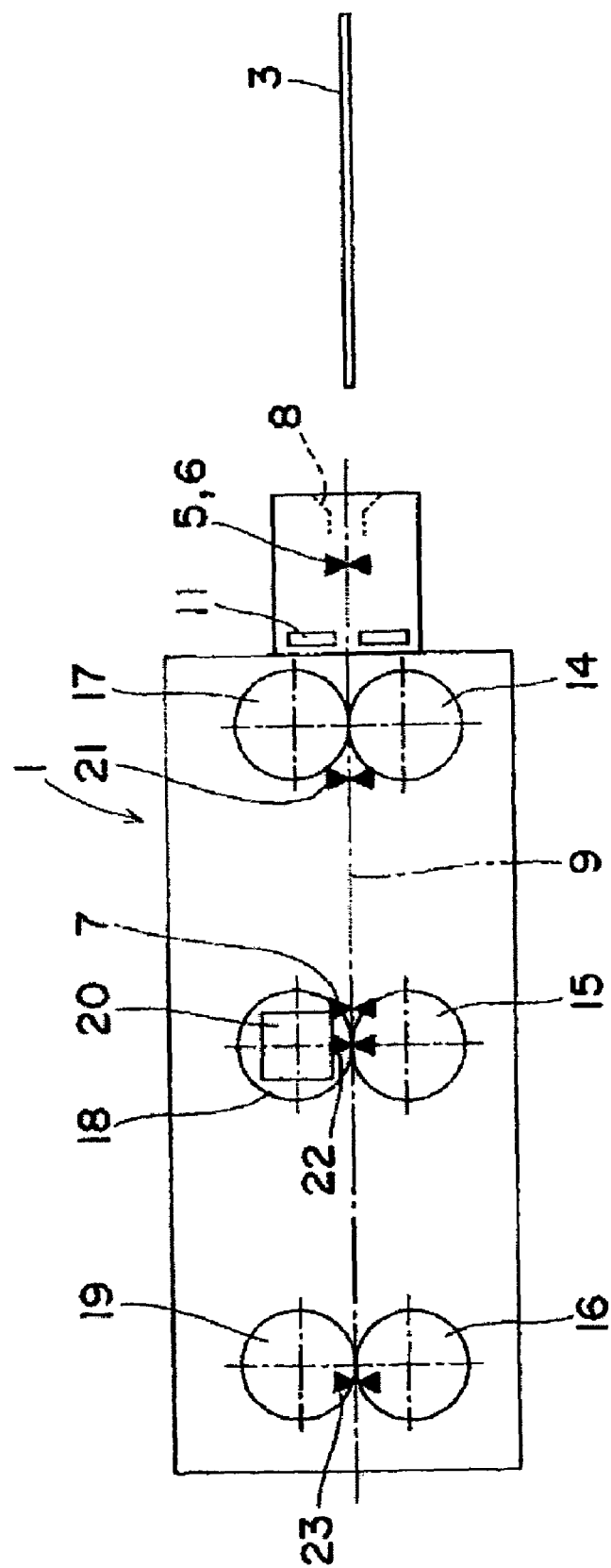
FIG. 2 is a side view of the card reader.
Figure 3:
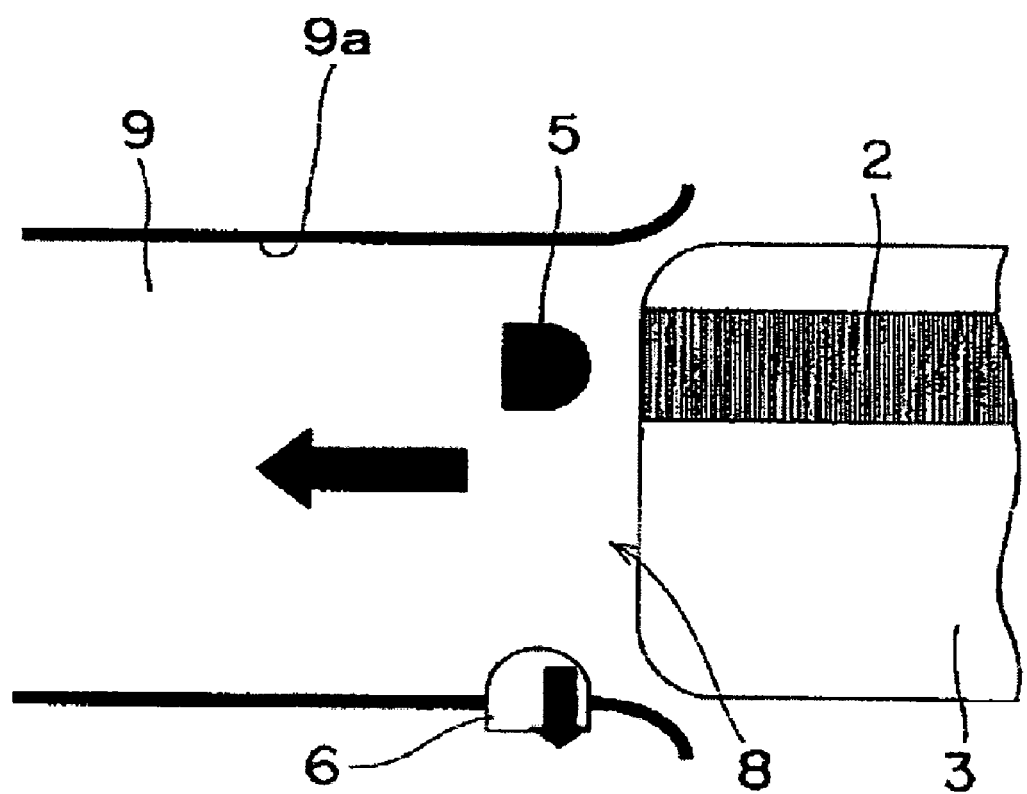
FIG. 3 is a plan view of the card reader.

FIGS. 1 through 4 show an embodiment of card reader 1. The card reader 1 transports card 3 having a magnetic strip 2 with a drive means 4 that reads and writes information on the card 3, as illustrated in FIGS. 2 and 3.

FIG. 2 shows a basic configuration of the card reader 1. Arranged on a card running path 9 that is inside a card insertion slot 8 are a prehead 5, which searches the presence of magnetic information recorded on the magnetic strip 2 on the card 3 to recognize the insertion of the card 3, a pat roller arranged opposite to the prehead 5, a card detecting switch 6 arranged near the card insertion slot 8, and a shutter 11, which prevents foreign matters from coming in but opens the card running path 9 with a drive means such as solenoid 10 when the entering object is a card 3. Arranged inside the shutter 11 are card-sending rollers 14–16 which are to be driven by a card-sending motor 13, driven rollers 17–19 arranged opposite from the card-sending rollers 14–16, a first card position detector 7 for detecting the position of the card 3 in transportation, a magnetic head 20 arranged next to the driven roller 18 for reading/writing the magnetic information, and second, third and fourth card position detectors 21–23 which are arranged on the card running path 9 further inside the card-sending roller 14 at a shorter pitch than the card length.

In this embodiment, the prehead 5 and the card detecting switch 6 are positioned near the card insertion slot 8, before the shutter 11, and laterally parallel to each other on the card running path.

Note that the prehead 5 and the card detecting switch 6 may not only be arranged laterally parallel to each other, but may be shifted from one another in the card running direction. In that case, it is necessary to measure in advance the positional relationship (for example, the distance) between the prehead 5 and the card detecting switch 6 and to save the measurement in CPU 24 as a correction value.

Also, the first card position detector 7 and the second, third, and fourth card position detectors 21–23 are photo sensors composed of a photo-emitting device and a photo-receiving device; however, other sensors such as a mechanical switch may be used.

In this embodiment, the first card position detector 7 is arranged near the second driven roller 18 as shown in FIG. 2; it detects an edge portion (the incoming edge in this embodiment) of the card 3 in transportation and then ends a pulse counter operation that measures the length of the card. Also it times for the magnetic head 20 (which is described later) to read/write magnetic information.

Further, the second position detector 21 is arranged behind the card-sending roller 14 and the first driven roller 17 to detect the card 3. The third card position detector 22 is arranged at the same position as the read/write magnetic head 20. The fourth card position detector 23 is arranged behind the card-sending roller 16 and the third driven roller 19 and near the card stop position to time for the card 3 to stop.

The drive means 4 has a card sending motor 13, the card-sending rollers 14–16, an encoder 25 for detecting the rotation of the card sending motor 13, and a driver 26 for driving the card sending motor 13.

Figure 4:
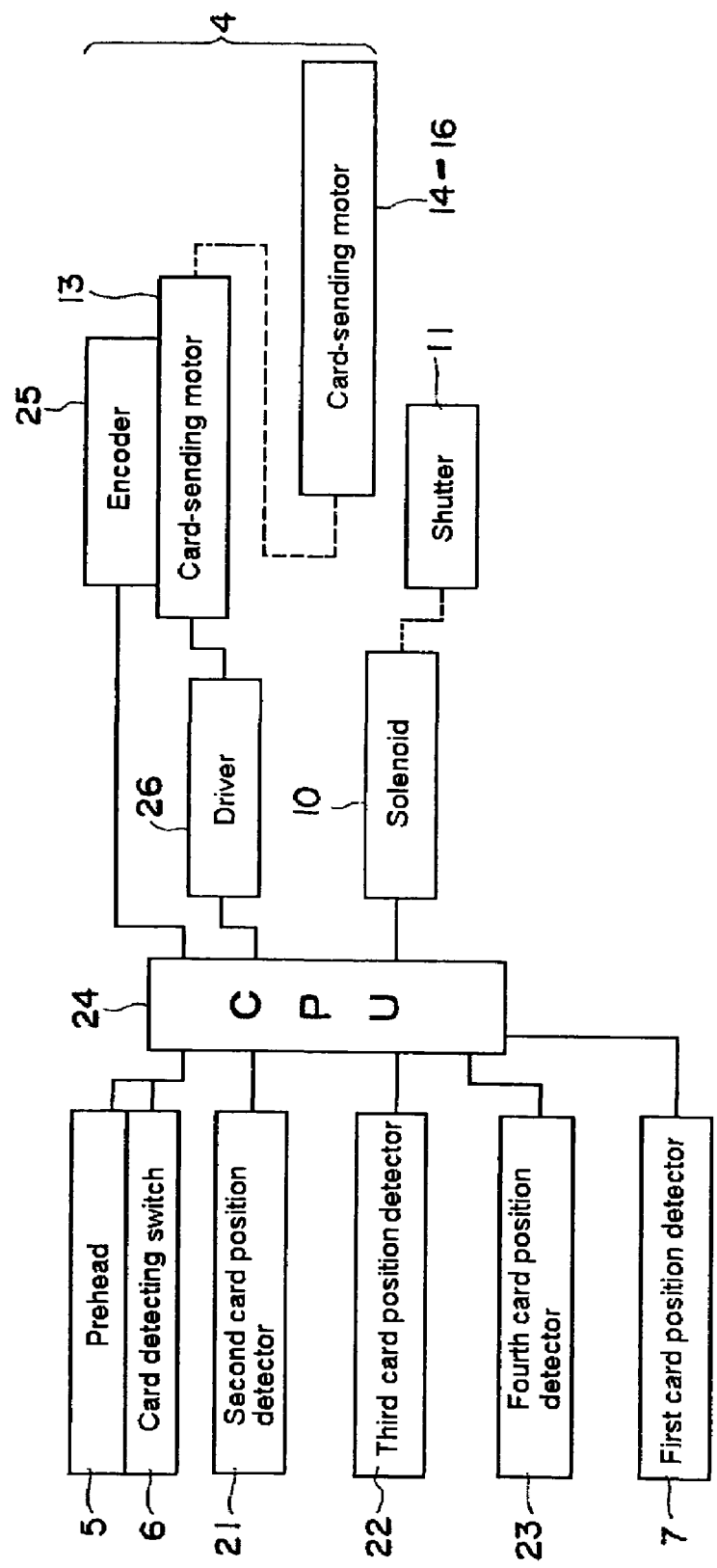
FIG. 4 is a block diagram of a CPU-centered circuit of the card reader.

FIG. 4 shows a block diagram of a CPU-centered circuit; connected to the CPU 24 that controls the entire operation are the prehead 5, the card detecting switch 6, the first card position detector 7, the second through fourth card position detectors 21–23, the encoder 25, the driver 26, and the solenoid 10 for driving the shutter 11. Note that the prehead 5 may recognize the insertion of the card as in conventional card readers and detect the presence of the card using another mechanical or optical switch.

Next the operation of the card reader 1 is described based on the flowchart of FIG. 1. The shutter 11 is closed to block the card running path 9 when idle. As a card 3 (a credit card or a prepaid card) is inserted at the card insertion slot 8 (Step 1 (S1)), the prehead 5 searches for the magnetic strip 2 on the card 3, and (with the magnetic strip detected,) the card detecting switch 6 is almost simultaneously turned on to drive the solenoid 10, which in turn opens the shutter 11 so that the card 3 can be pushed by hand to the card-sending roller 14.

In this embodiment, as a signal indicating ON or OFF is output by the card detecting switch 6 to the CPU 24, a signal indicating "magnetic information present" is also output by the prehead 5 to the CPU 24 while the card 3 is in transportation, i.e., while the card 3 is being slid against the magnetic strip 2.

When the prehead 5 and the card detecting switch 6 detect the card 3, the card sending motor 13 is driven. Accordingly, each of the card-sending rollers 14 through 16 are rotated; when an edge portion (the incoming edge, here) reaches the card-sending roller 14, the card-sending roller 14 starts transporting the card 3 on the card running path 9. Then, a pulse signal corresponding to the number of rotations of the card-sending roller 14 is input to the CPU 24 in which the transporting distance of the card 3 is calculated based on the pulse number. Even after that, the card 3 that is separated from the hand of a user is continually taken further inside the card reader.

When the card detecting switch 6 is turned off (Step 2 (S2); YES), the card transportation pulse counter is reset and the pulse counter starts counting the pulse (Step 3 (S3)). In other words, when the card 3 leaves the card detecting switch 6, (the card reader) starts measuring the length of the card 3. The pulse signals from the card-sending roller 14 are used for measurement and the measurement starts when (the counter) starts counting the pulse from zero.

Then, it is determined if there is an input by the prehead 5 (Step 4 (S4)). In other words, since the signal indicating "magnetic information present" is output by the prehead 5 to the CPU 24 while the card 3 is being transported, it is determined if the signal from the prehead 5 is input. When there is an input (Step 4 (S); YES), it is determined that the card 3 is present although the card detecting switch 6 is off, and a specially-shaped card flag which indicates the card 3 is a specially-shaped card is set (Step 5 (S5)). When there is no input (Step 4 (S4); NO), it means that there is no output signal from the card detecting switch 6 and the prehead 5; therefore, the card 3 is identified not a specially-shaped card, and the specially-shaped card flag is cleared (Step 6 (S6)).

Next, the length of the card 3 in transportation is calculated. After the specially-shaped card flag is set or cleared, it is determined if the first card position detector 7 is turned on (Step 7 (S7)); when it is ON (Step 7 (S7); YES), the transportation counter is stopped and the length of the card is calculated (Step 8 (S8)). Based on the counter value (number), the distance the card 3 is transported starting from the position the card detecting switch 6 is turned off can be calculated; based on the distance between the card detecting switch 6 and the first card position detector 7 as well as the card transportation distance, the card length can be calculated.

Further, it is determined if the card length is normal (Step 9 (S9)); when the card length is normal (Step 9 (S9); YES), the card 3 is identified as a normal card (Step 10 (S10)); when the card length is not normal (Step 9 (S9); NO), the specially-shaped card flag is checked (Step 11 (S11)). If the flag is set (Step 11 (S11); YES), the card 3 is identified as a specially-shaped card (Step 12 (S12); if the flag is cleared (Step 11 (S11); NO), the card 3 is identified as an abnormal card (Step 13 (S13)).

Figure 5:
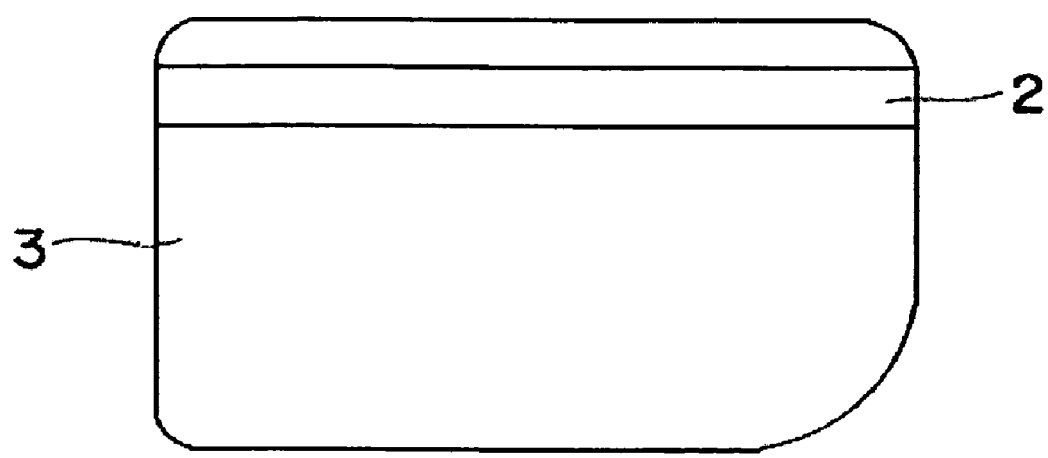
FIG. 5 is a plan view of an example of a specially-shaped card.

For example, suppose that the specially-shaped card shown in FIG. 5 is taken inside the card reader 1. Even if the card detecting switch 6 is turned off (Step 2 (S2); YES), since there is an input from the prehead 5 (Step 4 (S4); YES), a specially-shaped card flag is set (Step 5 (S5)). Thus, even if the card length is determined to be abnormal (Step 9 (S9); NO), since the flag is set (Step 11 (S1); YES), the card 3 in transportation is identified as a specially-shaped card (Step 12 (S12)). Note that a specially-shaped card 3 is not limited to the one shown in FIG. 5.

After the above steps, the card is processed accordingly depending on whether the card is in a normal, special, or abnormal shape. For example, if the card is in a special shape, it may be indicated that the writing performance may be degraded; if the card is in an abnormal shape, the card is discharged.

When the card 3 is a normal card, the operation proceeds in the following manner: as the card reaches the magnetic head 20 and keeps running further, the magnetic information recorded on the magnetic strip 2 is read; when the second card position detector 22 no longer detects the card 3, it is determined that the card 3 has passed the magnetic head 20 and the card sending motor 13 is reversed to return the card 3. If the information recorded on the card 3 needs to be updated, the card 3 is run back and forth two or three times with respect to the magnetic head 20 for reading/writing the information. Since this operation is well known, a detailed description is not provided here.

When the card 3 is a specially-shaped card, the writing performance will be degraded for the reasons which are to be described later. However, the magnetic information recorded on the magnetic strip can be read at least. Thus, it is possible that a card reader selectively processes the reading of the magnetic information.

Note that in a general card reader, the inserted card 3 is pressed toward a fiducial side 9a on the card running path 9 by a pressing member (not illustrated) so that the reading/writing by the magnetic head 20 with the magnetic strip 2 on the card 3 is accurately performed as shown in FIG. 3.

Because of the configuration mentioned above, the card detecting switch 6 is arranged opposite from the fiducial side 9a. Also, since the card detecting switch 6 functions in such a way that it is turned on as the inserted card 3 is pushed in the lateral direction and turned off as the card 3 is detached, it has a function to press the card 3 toward the fiducial side 9a.

Since the card detecting switch 6 is arranged opposite from the fiducial side 9a, when both the prehead 5 and the card detecting switch 6 are actuated and the insertion of the card 3 is detected, it can be determined that the card 3 is a card having a width longer than the standard width and the shutter 11 be actuated to take the card 3 inside the card reader 1. In other words, if the card detecting switch 6 is not actuated, the inserted card 3 is identified as a card having a width shorter than the standard width, which indicates an abnormal card. Accordingly the shutter 11 is not actuated and consequently the card is not taken inside the card reader, preventing an abnormal card from entering the card reader.

According to the embodiment described above, the conventionally-provided prehead 5 can be used as it is; therefore, there is no need to add new components. The present invention can be implemented only by simply updating the software for card readers already on the market.

Also, in this embodiment, the length of a card is calculated using the first card position detector 7; however, it may be measured based on the information from the prehead 5, not using the sensor 7. In this case, it is determined that the magnetic strip 2 is present while the prehead 5 obtains the magnetic information, and the length of the magnetic strip 2 is accurately measured.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader which transports a card having a magnetic strip with a drive means to read and write information on the card, comprising:
   a prehead for detecting the insertion of said card by searching the presence of the magnetic information recorded on said magnetic strip; and
   a card detecting switch for detecting said card;
   wherein said card detecting switch determines that said card is present while said prehead searches said magnetic information; and when said card detecting switch does not detect said card, said card is distinguished as a specially-shaped card,
   wherein the card detecting switch determines no card is detected after a predetermined amount of time, after the card was initially determined to be present,
   and the card is distinguished as a predetermined specially-shaped card based on the continuing length of time of the magnetic output of the pre-head without the presence of a card detecting output from the card detecting switch.

2. The card reader of claim 1, wherein the prehead and the card detecting switch are laterally parallel to each other on a card transport path.

3. The card reader of claim 1, wherein the prehead and the card detecting switch are not laterally parallel to each other on a card transport path.

4. The card reader of claim 3, wherein the distance between the prehead and the card detecting switch is saved as a correction value in a CPU.

5. The card reader of claim 1, wherein the card reader further includes a first, a second, a third and a fourth card position detectors that are photo sensors.

6. The card reader of claim 5, wherein the photo sensor is composed of a photo emitting device and a photo receiving device.

7. The card reader of claim 5, wherein the first card position detector detects the length of the card.

8. A card reader which transports a card having a magnetic strip with a drive means to read and write information on the card, comprising:

a prehead for detecting the insertion of said card by searching the presence of the magnetic information recorded on said magnetic strip;

a card detecting switch for detecting said card;

at least one card position detector for detecting the position of the card in the card transport path;

wherein when it is determined that said card is present said prehead searches said magnetic information; and when it is determined that said card detecting switch does not detect said card, said card is distinguished as a specially-shaped cards, wherein the card detecting switch determines no card is detected after a predetermined amount of time, after the card was initially determined to be present, and the card is distinguished as a predetermined specially-shaped card based on a continuing length of time of the magnetic output of the pre-head without the presence of a card detecting output from the card detecting switch.

9. The card reader of claim 8, wherein the prehead and the card detecting switch are laterally parallel to each other on a card transport path.

10. The card reader of claim 8, wherein the prehead and the card detecting switch are not laterally parallel to each other on a card transport path.

11. The card reader of claim 10, wherein the distance between the prehead and the card detecting switch is saved as a correction value in a CPU.

12. The card reader of claim 8, wherein the card reader includes a first, a second, a third and a fourth card position detectors that are photo sensors.

13. The card reader of claim 12, wherein the photo sensor is composed of a photo emitting device and a photo receiving device.

14. The card reader of claim 8, further comprising a shutter that opens the card transport path and prevents foreign matters from entering the card reader.

15. The card reader of claim 12, wherein the first card position detector detects the length of the card.

16. A card reader which transports a card having a magnetic strip with a drive means to read and write information on the card, comprising:

a card transport path;

a prehead for detecting the insertion of said card by searching the presence of the magnetic information recorded on said magnetic strip;

a card detecting switch for detecting said card;

a plurality of card sending rollers driven by a motor;

a plurality of driven rollers having the same amount of and opposite from the card sending rollers;

at least one card position detector for detecting the position of the card in the card transport path;

a magnetic head for reading and writing the magnetic information on the card;

wherein when it is determined that said card is present said prehead searches said magnetic information; and when it is determined that said card detecting switch does not detect said card, said card is distinguished as a specially-shaped card, wherein the card detecting switch determines no card is detected after a predetermined amount of time, after the card was initially determined to be present, and the card is distinguished as a predetermined specially-shaped card based on the continuing length of time of the magnetic output of the pre-head without the presence of a card detecting output from the card detecting switch.

17. The card reader of claim 16, wherein the prehead and the card detecting switch are laterally parallel to each other on the card transport path.

18. The card reader of claim 16, wherein the prehead and the card detecting switch are not laterally parallel to each other on the card transport path.

19. The card reader of claim 18, wherein the distance between the prehead and the card detecting switch is saved as a correction value in a CPU.

20. The card reader of claim 16, wherein the card reader includes a first, a second, a third and a fourth card position detectors that are photo sensors.

21. The card reader of claim 16, wherein the photo sensor is composed of a photo emitting device and a photo receiving device.

22. The card reader of claim 16, further comprising a shutter that opens the card transport path and prevents foreign matters from entering the card reader.

23. The card reader of claim 20, wherein the first card position detector detects the length of the card.

24. The card reader of claim 1, wherein the card reader further comprises a measuring means which measures the length of the card by using the magnetic output of the pre-head from the time when the card detecting switch is turned on.

25. The card reader of claim 24, wherein the measuring means includes a calculator for calculating the transporting distance of the card based on the rotation of the card-sending roller.

* * * * *